(12) United States Patent
Suciu et al.

(10) Patent No.: US 10,215,096 B2
(45) Date of Patent: Feb. 26, 2019

(54) ENGINE WITH NOSE CONE HEAT EXCHANGER AND RADIALLY OUTER DISCHARGE

(71) Applicant: United Technologies Corporation, Hartford, CT (US)

(72) Inventors: Gabriel L. Suciu, Glastonbury, CT (US); Jesse M. Chandler, South Windsor, CT (US)

(73) Assignee: United Technologies Corporation, Farmington, CT (US)

( * ) Notice: Subject to any disclaimer, the term of this patent is extended or adjusted under 35 U.S.C. 154(b) by 606 days.

(21) Appl. No.: 14/932,066

(22) Filed: Nov. 4, 2015

(65) Prior Publication Data

US 2017/0122207 A1    May 4, 2017

(51) Int. Cl.
| | | |
|---|---|---|
| *F02C 7/04* | (2006.01) | |
| *F02C 7/14* | (2006.01) | |
| *F01D 5/12* | (2006.01) | |
| *F01D 9/04* | (2006.01) | |
| *F02C 3/04* | (2006.01) | |
| *F02C 7/18* | (2006.01) | |

(Continued)

(52) U.S. Cl.
CPC ............... *F02C 7/14* (2013.01); *B64C 11/14* (2013.01); *F01D 5/12* (2013.01); *F01D 9/041* (2013.01); *F02C 3/04* (2013.01); *F02C 7/18* (2013.01); *F02K 3/06* (2013.01); *F05D 2220/32* (2013.01); *F05D 2240/35* (2013.01); *F05D 2260/213* (2013.01)

(58) Field of Classification Search
CPC ...... F02C 7/14; F02C 3/04; F02C 7/18; F01D 5/12; F01D 9/041; F01D 25/12; F02K 3/06; F05D 2220/32; F05D 2240/35; F05D 2260/213; B64C 11/00; B64C 11/02; B64C 11/14; B64C 21/00; B64C 23/00; B64C 23/02; B64C 23/08; B64C 1/38
USPC .......................................................... 60/806
See application file for complete search history.

(56) References Cited

U.S. PATENT DOCUMENTS

| | | | | |
|---|---|---|---|---|
| 2,330,622 A | * | 9/1943 | Ramshorn | F01P 7/02 123/41.65 |
| 2,670,050 A | * | 2/1954 | Enos | B64C 11/14 416/160 |

(Continued)

FOREIGN PATENT DOCUMENTS

| | | |
|---|---|---|
| EP | 3054112 A1 | 8/2016 |
| EP | 3081781 A1 | 10/2016 |

OTHER PUBLICATIONS

U.S. Appl. No. 14/617,366.

(Continued)

*Primary Examiner* — Jason D Shanske
*Assistant Examiner* — Brian Christopher Delrue
(74) *Attorney, Agent, or Firm* — Carlson, Gaskey & Olds, P.C.

(57) ABSTRACT

A gas turbine engine has a nose cone, a fan for delivering air into a bypass duct as bypass flow, and into a core engine to be delivered to a compressor. The nose cone includes a vent to receive air and deliver the air across a heat exchanger, which receives a fluid to be cooled. The air from the vents is delivered to an outlet downstream of the heat exchanger, such that a majority of the air being delivered to the outlet becomes part of the bypass flow.

19 Claims, 4 Drawing Sheets

(51) Int. Cl.
*F02K 3/06* (2006.01)
*B64C 11/14* (2006.01)

(56) References Cited

U.S. PATENT DOCUMENTS

| | | | | |
|---|---|---|---|---|
| 2,726,725 A * | 12/1955 | Nichols | ............. | B64C 11/14 416/94 |
| 2,891,627 A * | 6/1959 | Ditmer | ............. | B64C 11/40 416/157 R |
| 2,927,725 A * | 3/1960 | Rainbow | ............. | F01D 17/162 415/115 |
| 2,979,293 A * | 4/1961 | Mount | ............. | B64D 13/006 165/43 |
| 2,986,220 A * | 5/1961 | Bodem | ............. | B64C 11/40 416/1 |
| 3,228,476 A * | 1/1966 | Brown | ............. | B64C 11/14 416/94 |
| 3,363,419 A * | 1/1968 | Wilde | ............. | F02K 3/062 415/119 |
| 3,720,060 A * | 3/1973 | Davies | ............. | F01D 7/00 415/129 |
| 3,942,911 A * | 3/1976 | Keenan | ............. | F01D 7/00 416/157 A |
| 4,171,183 A * | 10/1979 | Cornell | ............. | B64C 11/00 416/223 R |
| 4,722,666 A * | 2/1988 | Dennison | ............. | A61M 1/101 416/174 |
| 4,790,133 A * | 12/1988 | Stuart | ............. | F02C 3/067 415/65 |
| 4,934,140 A * | 6/1990 | Dennison | ............. | F02C 7/20 244/54 |
| 4,999,994 A * | 3/1991 | Rüd | ............. | F02C 7/047 416/170 R |
| 5,010,729 A * | 4/1991 | Adamson | ............. | F02C 3/067 416/129 |
| 5,056,738 A * | 10/1991 | Mercer | ............. | F01D 5/16 244/54 |
| 5,182,906 A | 2/1993 | Gilchrist et al. | | |
| 5,232,333 A * | 8/1993 | Girault | ............. | F02K 9/48 415/111 |
| 6,561,763 B2 | 5/2003 | Breakwell | | |
| 7,559,191 B2 * | 7/2009 | Parks | ............. | B64C 11/001 416/245 R |
| 7,631,480 B2 * | 12/2009 | Suciu | ............. | F01D 5/022 60/39.43 |
| 7,845,157 B2 * | 12/2010 | Suciu | ............. | F02C 3/073 60/226.1 |
| 7,882,694 B2 * | 2/2011 | Suciu | ............. | F01D 17/162 60/226.1 |
| 7,931,235 B2 | 4/2011 | Zanarelli et al. | | |
| 8,221,080 B2 * | 7/2012 | Clemen | ............. | B64C 11/14 416/94 |
| 8,529,204 B2 | 9/2013 | Bagnall | | |
| 8,753,094 B2 | 6/2014 | Bottome | | |
| 9,062,566 B2 * | 6/2015 | Suciu | ............. | F01D 25/12 |
| 9,127,566 B2 * | 9/2015 | Suciu | ............. | F02C 7/047 |
| 2004/0060279 A1 * | 4/2004 | Robert Joseph | ............. | F01D 1/24 60/226.1 |
| 2006/0027356 A1 * | 2/2006 | Sulzer | ............. | E04C 2/525 165/53 |
| 2007/0056291 A1 * | 3/2007 | Koenig | ............. | B64C 11/02 60/784 |
| 2011/0027080 A1 * | 2/2011 | Cruickshank | ............. | F04D 29/2294 416/1 |
| 2011/0103951 A1 * | 5/2011 | Mazzouji | ............. | F03B 3/02 416/1 |
| 2013/0259639 A1 * | 10/2013 | Suciu | ............. | F02C 7/047 415/1 |
| 2015/0315922 A1 * | 11/2015 | Roach | ............. | F02C 7/04 416/93 R |
| 2016/0281721 A1 * | 9/2016 | Army, Jr. | ............. | F04D 17/16 |
| 2016/0298540 A1 * | 10/2016 | Suciu | ............. | F02C 7/04 |
| 2016/0298544 A1 * | 10/2016 | Suciu | ............. | F02C 7/06 |
| 2016/0312787 A1 * | 10/2016 | Sato | ............. | B22D 11/003 |
| 2017/0044991 A1 * | 2/2017 | Suciu | ............. | F01D 25/162 |

OTHER PUBLICATIONS

U.S. Appl. No. 14/685,325.
European Search Report for European Application No. 16196921.7 dated Apr. 3, 2017.

* cited by examiner

ENGINE WITH NOSE CONE HEAT EXCHANGER AND RADIALLY OUTER DISCHARGE

BACKGROUND OF THE INVENTION

Gas turbine engines are known and typically include a fan delivering air into a compressor. Air is compressed in the compressor and delivered into a combustion section where it is mixed with fuel and ignited. Products of this combustion pass downstream over turbine rotors, driving them to rotate. The turbine rotors, in turn, rotate the compressor and fan rotors.

Various accessories and associated systems are included on a gas turbine engine. Thus, there are typically a number of fluids which need to be cooled. As an example, oil for a pump or other associated system must be cooled in a heat exchanger.

SUMMARY OF THE INVENTION

This application relates to a heat exchanger positioned within a nose cone of a gas turbine engine, wherein air is driven across the heat exchanger to cool a fluid.

In a featured embodiment, a gas turbine engine has a nose cone, a fan for delivering air into a bypass duct as bypass flow, and into a core engine to be delivered to a compressor. The nose cone includes a vent to receive air and deliver the air across a heat exchanger, which receives a fluid to be cooled. The air from the vents is delivered to an outlet downstream of the heat exchanger, such that a majority of the air being delivered to the outlet becomes part of the bypass flow.

In another embodiment according to the previous embodiment, a stationary vane is included. The nose cone communicates air downstream of the heat exchanger into an interior of the stationary vane to be delivered to the outlet.

In another embodiment according to any of the previous embodiments, the fluid to be cooled by the heat exchanger passes through the vane to the heat exchanger.

In another embodiment according to any of the previous embodiments, there are a plurality of the outlets. The vane has a radial span and at least a majority of the outlets are positioned in an outer 50 percent of the span.

In another embodiment according to any of the previous embodiments, all of the outlets are in the outer 50 percent of the span.

In another embodiment according to any of the previous embodiments, there are impeller blades in the nose cone which move the air from the vent across the heat exchanger.

In another embodiment according to any of the previous embodiments, there are a plurality of circumferentially spaced nose cone outlets.

In another embodiment according to any of the previous embodiments, there are a plurality of the vanes, and each of the vanes has an inlet to receive air from the nose cone outlets.

In another embodiment according to any of the previous embodiments, the vane is upstream of the fan.

In another embodiment according to any of the previous embodiments, the fluid to be cooled is oil.

In another embodiment according to any of the previous embodiments, there are a plurality of circumferentially spaced nose cone outlets.

In another embodiment according to any of the previous embodiments, there are a plurality of the vanes, and each of the vanes has an inlet to receive air from the nose cone outlets.

In another embodiment according to any of the previous embodiments, there are impeller blades in the nose cone which move the air from the vent across the heat exchanger.

In another embodiment according to any of the previous embodiments, the vane is upstream of the fan.

In another embodiment according to any of the previous embodiments, the fluid to be cooled is oil.

In another embodiment according to any of the previous embodiments, the vane is upstream of the fan.

In another embodiment according to any of the previous embodiments, the fluid to be cooled is oil.

In another embodiment according to any of the previous embodiments, there are impeller blades in the nose cone which move the air from the vent across the heat exchanger.

In another embodiment according to any of the previous embodiments, there are a plurality of circumferentially spaced nose cone outlets.

In another embodiment according to any of the previous embodiments, the fluid to be cooled is oil.

These and other features may be best understood from the following drawings and specification.

DETAILED DESCRIPTION

Figure 1:
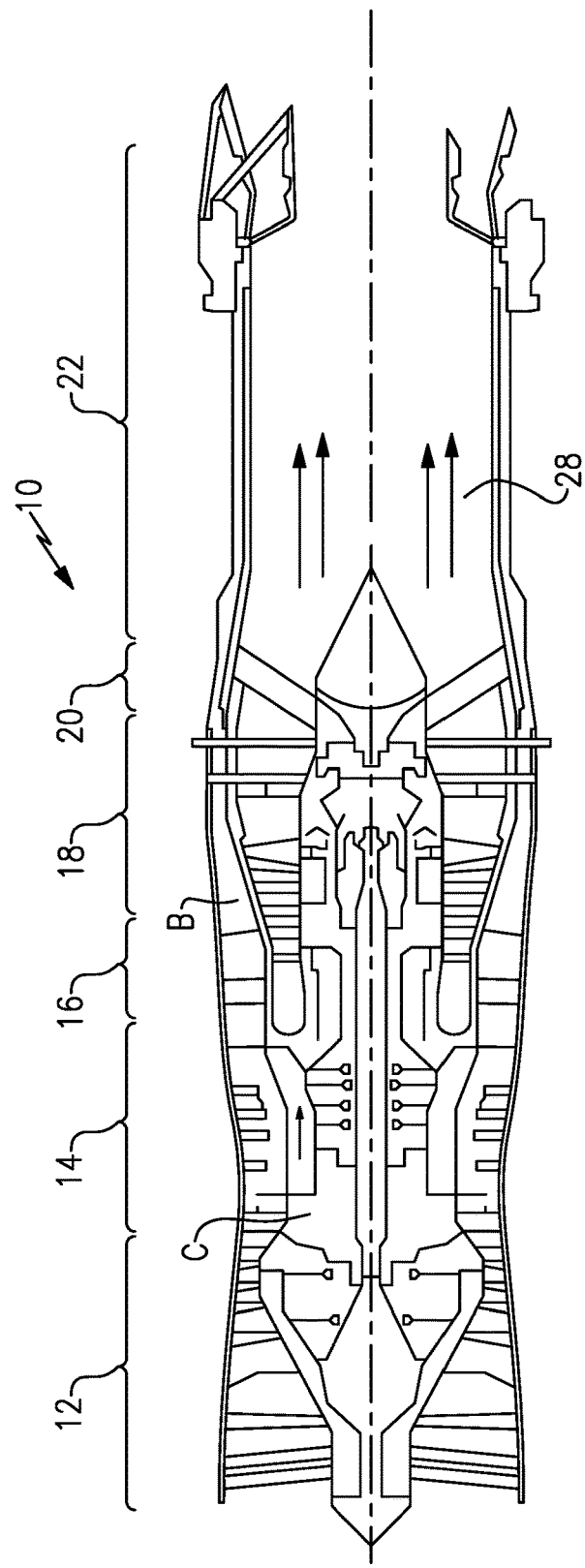
FIG. 1 schematically shows an embodiment of a gas turbine engine.

Referring to FIG. 1, a gas turbine engine 10 includes a fan section 12, a compressor section 14, a combustor section 16, and a turbine section 18. Air entering into the fan section 12 is initially compressed and fed to the compressor section 14. In the compressor section 14, the incoming air from the fan section 12 is further compressed and communicated to the combustor section 16. In the combustor section 16, the compressed air is mixed with gas and ignited to generate a hot exhaust stream 28. The hot exhaust stream 28 is expanded through the turbine section 18 to drive the fan section 12 and the compressor section 14. In this example, the gas turbine engine 10 includes an augmenter section 20 where additional fuel can be mixed with the exhaust gasses 28 and ignited to generate additional thrust. The exhaust gasses 28 flow from the turbine section 18 and the augmenter section 20 through an exhaust liner assembly 22.

Figure 2:
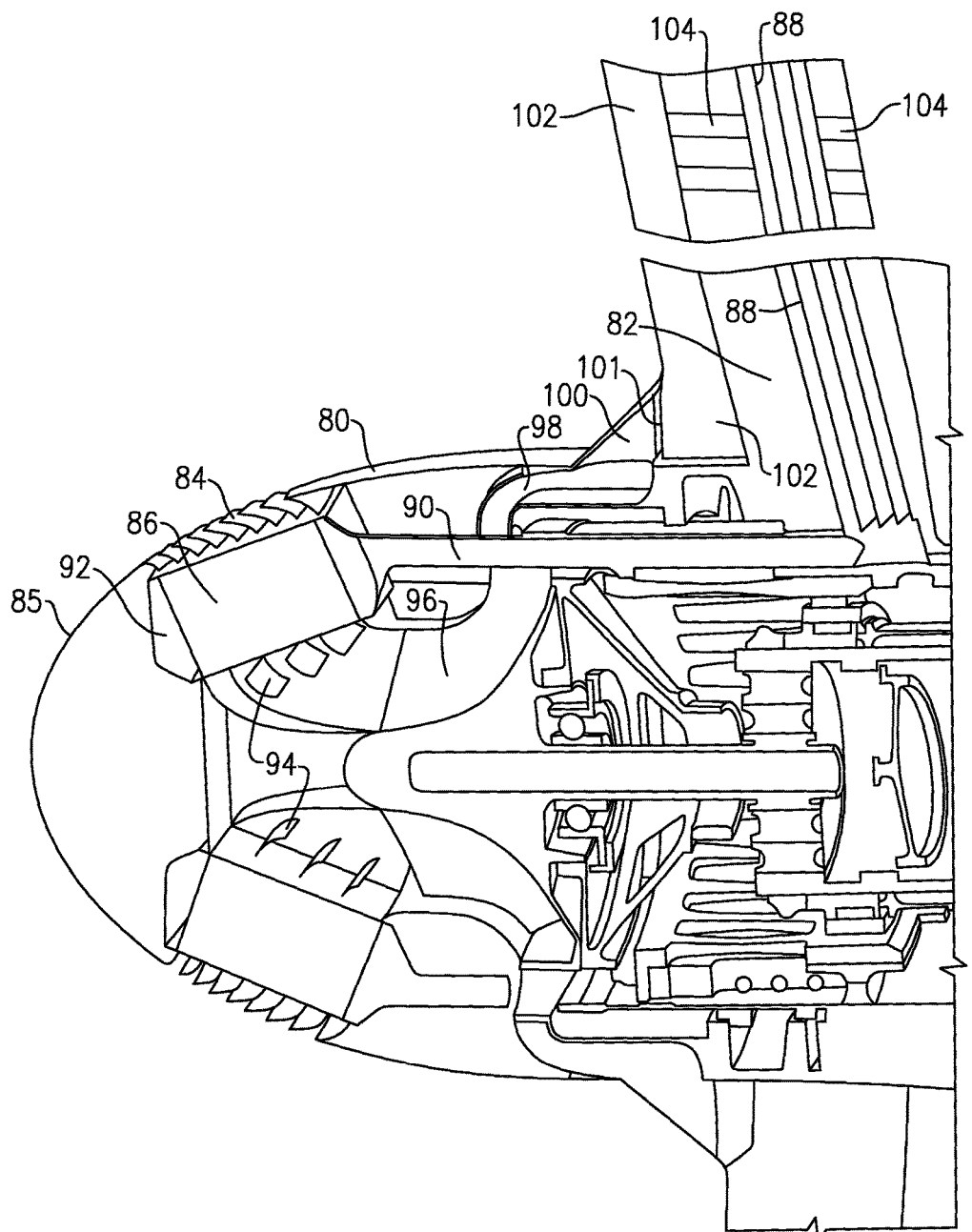
FIG. 2 shows is a cross-sectional view through an embodiment of a nose cone taken along line 2-2 in FIG. 1.

FIG. 2 illustrates a nose cone 80 which may be included in a gas turbine engine, such as shown in FIG. 1.

A vane 82 is positioned forward of the fan rotor, such as shown in FIG. 1. Vents 84 are formed at a forward end 85 of the nose cone 80. The vents 84 allow air to pass over a heat exchanger 86. The heat exchanger 86 receives fluid to be cooled through conduits 88, which may pass through the vane 82 and into a tube 90 to deliver the fluid into the heat exchanger 86. Downstream of the heat exchanger 86, the fluid may return through a return path 92 (shown partially), such as to a use for the fluid. As an example, the fluid may be oil being delivered to cool bearings associated with the engine 10. However, there are many other applications for fluids which may desirably be cooled.

Impeller blades 94 are formed within a spinning portion and compress the air to draw the air through the vents 84. Downstream of the impeller 94, the air reaches a pathway 96, flows into a tube 98 and to an outlet 100 for the nose cone. The outlet 100 is shown associated with an inlet 101 into a cooling channel or pathway 102 in the vane 82.

As can be appreciated from FIG. 1, air delivered downstream by the fan passes in a portion as bypass air to a bypass duct B and as a portion as core airflow C. As will be explained below, the majority of the air leaving the nose cone through outlet 100 will be delivered outwardly of the vane 82 at radially outer locations shown as outlet or exits 104. Thus, more of the air leaving outlets 104 is bypass air to duct B and less becomes core airflow C. Of course, these flows are shown schematically in FIG. 1.

Figure 3:
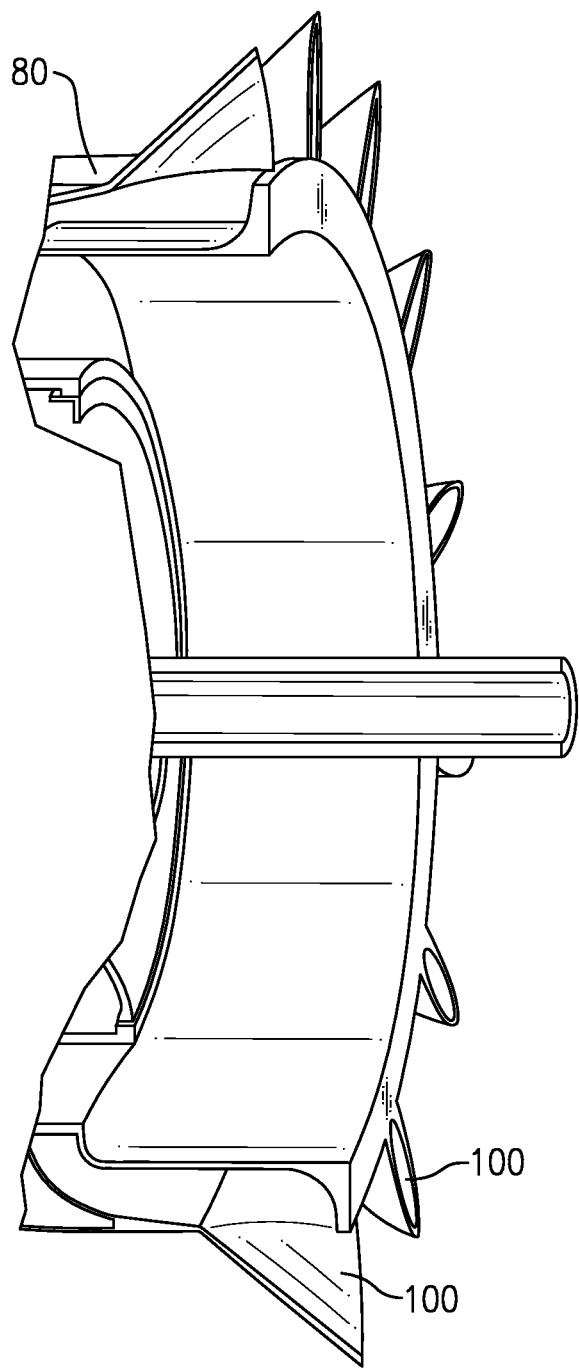
FIG. 3 shows a detail of the nose cone embodiment of FIG. 2.

As shown in FIG. 3, there are a plurality of the nose cone outlets 100, which are circumferentially spaced.

Figure 4:
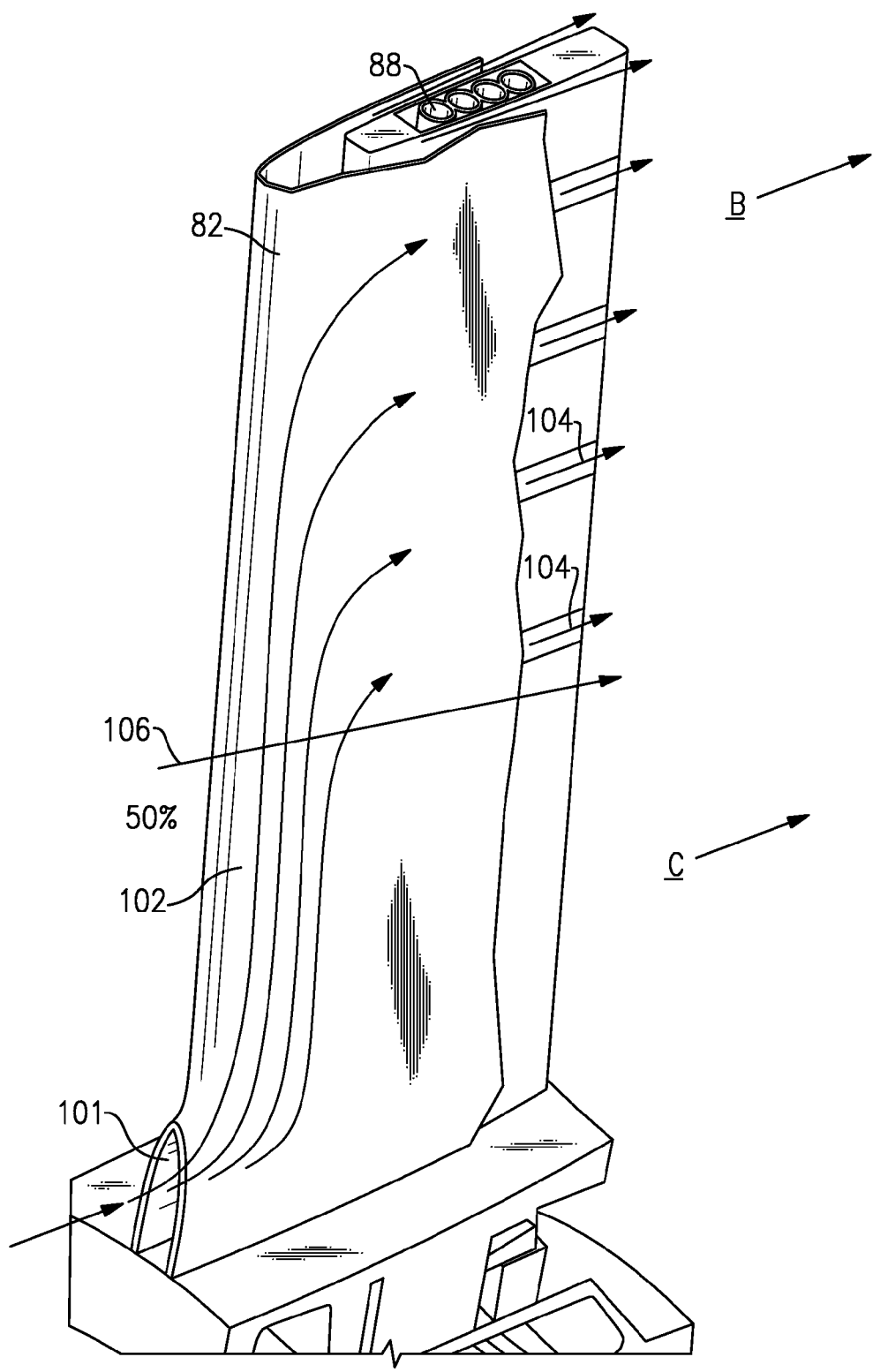
FIG. 4 shows a detail of an embodiment of a vane downstream of a fan rotor.

As shown in FIG. 4, there is an inlet 101 associated with each vane 82. As shown, the conduits 88 extend through the vane and the airflow from the pathway 102 reaches a plurality of outlets or exit ports 104, which will deliver the air into the bypass airflow. As shown, line 106 is a 50 percent span of the vane 82. The outlets 104 are all preferably outward of this 50 percent span, but at least a majority are. A majority of the airflow from outlets 104 thus reaches the bypass airflow B as opposed to the core airflow C.

There could be challenges with air heated by the heat exchanger being delivered into the core airflow. That is, the increase in air temperature from the heat exchanger 86 could lower the efficiency of the engine should the exhaust air be delivered in large quantity into the compressor section. This disclosure addresses that concern.

Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A gas turbine engine comprising:
a nose cone;
a fan for delivering air into a bypass duct as bypass flow, and into a core engine, to be delivered to a compressor;
said nose cone including a heat exchanger, and vents to receive air and deliver said air across said heat exchanger, said heat exchanger receiving a fluid to be cooled, and the air from the vents being delivered to an outlet downstream of the heat exchanger, such that a majority of the air being delivered to said outlet becomes part of the bypass flow;
wherein a stationary vane is included, and said nose cone communicates air downstream of the heat exchanger into an interior of the stationary vane to be delivered to said outlet; and
wherein the fluid to be cooled by the heat exchanger passes through said vane to said heat exchanger.

2. The gas turbine engine as set forth in claim 1, wherein there are a plurality of said outlets, and said vane has a radial span and at least a majority of said outlets are positioned in an outer 50 percent of said span.

3. The gas turbine engine as set forth in claim 2, wherein all of the outlets are in the outer 50 percent of said span.

4. The gas turbine engine as set forth in claim 2, wherein there are impeller blades in said nose cone which move the air from the vents across the heat exchanger.

5. The gas turbine engine as set forth in claim 4, wherein there are a plurality of circumferentially spaced nose cone outlets.

6. The gas turbine engine as set forth in claim 5, wherein there are a plurality of said vanes, and each of said vanes has an inlet to receive air from said nose cone outlets.

7. The gas turbine engine as set forth in claim 6, wherein the plurality of said vanes is upstream of said fan.

8. The gas turbine engine as set forth in claim 7, wherein said fluid to be cooled is oil.

9. The gas turbine engine as set forth in claim 1, wherein there are a plurality of circumferentially spaced nose cone outlets.

10. The gas turbine engine as set forth in claim 9, wherein there are a plurality of said vanes, and each of said vanes has an inlet to receive air from said nose cone outlets.

11. The gas turbine engine as set forth in claim 10, wherein there are impeller blades in said nose cone which move the air from the vents across the heat exchanger.

12. The gas turbine engine as set forth in claim 11, wherein the plurality of said vanes is upstream of said fan.

13. The gas turbine engine as set forth in claim 12, wherein said fluid to be cooled is oil.

14. The gas turbine engine as set forth in claim 1, wherein said vane is upstream of said fan.

15. The gas turbine engine as set forth in claim 14, wherein said fluid to be cooled is oil.

16. The gas turbine engine as set forth in claim 14, wherein there are a plurality of circumferentially spaced nose cone outlets.

17. The gas turbine engine as set forth in claim 14, wherein said fluid to be cooled is oil.

18. The gas turbine engine as set forth in claim 1, wherein there are impeller blades in said nose cone which move the air from the vents across the heat exchanger.

19. The gas turbine engine as set forth in claim 1, wherein said fluid to be cooled is oil.

* * * * *